United States Patent
Furcoiu

(10) Patent No.: US 10,941,887 B2
(45) Date of Patent: Mar. 9, 2021

(54) WIDE RANGE COUPLING

(71) Applicant: Mueller International, LLC, Atlanta, GA (US)

(72) Inventor: Aurelian Ioan Furcoiu, Chattanooga, TN (US)

(73) Assignee: Mueller International LLC, Atlanta, GA (US)

( * ) Notice: Subject to any disclaimer, the term of this patent is extended or adjusted under 35 U.S.C. 154(b) by 761 days.

(21) Appl. No.: 15/649,022

(22) Filed: Jul. 13, 2017

(65) Prior Publication Data

US 2019/0017636 A1    Jan. 17, 2019

(51) Int. Cl.
    F16L 21/02    (2006.01)
    F16L 21/03    (2006.01)
    F16L 21/08    (2006.01)

(52) U.S. Cl.
    CPC ............ F16L 21/022 (2013.01); F16L 21/03 (2013.01); F16L 21/08 (2013.01)

(58) Field of Classification Search
    CPC .......... F16L 21/022; F16L 21/08; F16L 21/03
    USPC ................................................ 285/337, 342
    See application file for complete search history.

(56) References Cited

U.S. PATENT DOCUMENTS

| | | | |
|---|---|---|---|
| 1,945,293 A | 1/1934 | Pierce | |
| 1,964,044 A * | 6/1934 | Engel | F16L 55/178 285/13 |
| 2,355,407 A | 8/1944 | Wyss | |
| 2,394,351 A | 2/1946 | Wurzburger | |
| 2,693,374 A | 11/1954 | Wurzburger | |
| 2,887,328 A | 5/1959 | Risley et al. | |
| 3,081,102 A | 3/1963 | Murray et al. | |
| 3,150,876 A | 9/1964 | Lafferty | |
| 3,162,469 A | 12/1964 | Shohan | |
| 3,163,432 A | 12/1964 | De Boer | |

(Continued)

FOREIGN PATENT DOCUMENTS

| | | |
|---|---|---|
| CA | 2458710 | 8/2005 |
| CA | 2458788 | 8/2005 |

(Continued)

OTHER PUBLICATIONS

Furcoiu, Aurelian Ioan; Requirement for Restriction/Election for U.S. Appl. No. 15/490,926, filed Apr. 19, 2017, dated Jul. 1, 2019, 9 pgs.

(Continued)

*Primary Examiner* — James M Hewitt, II
(74) *Attorney, Agent, or Firm* — Taylor English Duma LLP

(57) ABSTRACT

A wide range coupling includes a body, the body defining a first body end and a second body end, the body defining a body bore extending through the body from the first body end to the second body end, the body bore defining an axis, the body defining a body shoulder disposed at the first body end, the body shoulder extending radially inward into the body bore; and an end ring, the end ring positioned over the first body end, the end ring defining a ring shoulder extending radially inward towards the body; and a gasket connected to the end ring, the gasket disposed within the body bore, the end ring and the gasket configured to axially travel along the axis relative to the body, the end ring and the gasket selectively positionable about and between an engaged position and a disengaged position.

21 Claims, 9 Drawing Sheets

(56) References Cited

U.S. PATENT DOCUMENTS

| | | | |
|---|---|---|---|
| 3,179,446 A | 4/1965 | Paterson | |
| 3,186,741 A | 6/1965 | Kurtz | |
| 3,211,472 A | 10/1965 | Rickard | |
| 3,249,371 A | 3/1966 | Peterman | |
| 3,252,192 A | 5/1966 | Smith | |
| 3,315,970 A | 4/1967 | Holoway | |
| 3,315,971 A | 4/1967 | Sakurada | |
| 3,414,273 A | 12/1968 | Sumner | |
| 3,432,190 A | 3/1969 | Kunz | |
| 3,485,515 A | 12/1969 | Frishof | |
| 3,573,871 A | 4/1971 | Warner et al. | |
| 3,642,306 A | 2/1972 | Gheen et al. | |
| 3,653,695 A * | 4/1972 | Dunton | F16L 19/075 285/340 |
| 3,680,874 A | 8/1972 | Schwarz | |
| 3,684,317 A | 8/1972 | Kazienko et al. | |
| 3,698,744 A | 10/1972 | Bevington | |
| 3,877,733 A | 4/1975 | Straub | |
| 3,980,097 A | 9/1976 | Ellis | |
| 4,092,036 A | 5/1978 | Sato et al. | |
| 4,380,348 A | 4/1983 | Swartz | |
| 4,397,485 A | 8/1983 | Wood | |
| 4,410,479 A | 10/1983 | Cyriax | |
| 4,522,434 A | 6/1985 | Webb | |
| 4,538,841 A * | 9/1985 | Royston | F16L 21/04 285/337 |
| 4,544,188 A | 10/1985 | Dugger | |
| 4,568,112 A | 2/1986 | Bradley, Jr. et al. | |
| 4,569,542 A * | 2/1986 | Anderson | F16L 21/08 285/337 |
| 4,609,210 A | 9/1986 | Torokvei et al. | |
| 4,629,176 A | 12/1986 | Ceelen | |
| 4,741,356 A | 5/1988 | Letzo et al. | |
| 4,768,813 A | 9/1988 | Timmons | |
| 4,779,900 A | 10/1988 | Shumard | |
| 4,791,952 A | 12/1988 | Laurel | |
| 4,848,808 A | 7/1989 | Pannell et al. | |
| 4,858,968 A | 8/1989 | Moebius | |
| 4,890,967 A | 1/1990 | Rosenbaum | |
| 5,069,490 A * | 12/1991 | Halen, Jr. | F16L 21/04 285/337 |
| 5,071,175 A | 12/1991 | Kennedy, Jr. | |
| 5,121,946 A | 6/1992 | Jardine | |
| 5,205,568 A | 4/1993 | Stoll et al. | |
| 5,232,252 A | 8/1993 | Bartholomew | |
| 5,297,826 A | 3/1994 | Percebois et al. | |
| 5,324,083 A | 6/1994 | Vogelsang | |
| 5,335,946 A * | 8/1994 | Dent | F16L 21/04 285/243 |
| 5,398,980 A | 3/1995 | Hunter | |
| 5,437,481 A | 8/1995 | Spears et al. | |
| 5,468,025 A | 11/1995 | Adinolfe et al. | |
| 5,476,292 A * | 12/1995 | Harper | F16L 21/04 285/337 |
| 5,498,042 A | 3/1996 | Dole | |
| 5,505,499 A * | 4/1996 | Wallbank | F16L 5/02 285/139.1 |
| 5,803,110 A | 9/1998 | Segal | |
| 5,851,037 A * | 12/1998 | Bridges | F16L 21/08 285/342 |
| 5,941,576 A | 8/1999 | Krausz | |
| 6,106,029 A * | 8/2000 | DeMore | F16L 21/08 285/104 |
| 6,173,993 B1 | 1/2001 | Shumard et al. | |
| 6,273,469 B1 | 8/2001 | Kwaske et al. | |
| 6,293,556 B1 | 9/2001 | Krausz | |
| 6,364,372 B1 | 4/2002 | Marandi | |
| 6,457,718 B1 | 10/2002 | Quesada | |
| 6,481,762 B1 * | 11/2002 | Rex | F16L 17/025 285/104 |
| 6,830,268 B2 | 12/2004 | Krausz | |
| 7,232,160 B2 | 6/2007 | Krausz | |
| 7,243,955 B2 | 7/2007 | Krausz | |
| 7,469,939 B2 | 12/2008 | Westman et al. | |
| 7,571,940 B2 | 8/2009 | Krausz | |
| D602,127 S | 10/2009 | Shah et al. | |
| 7,625,018 B2 | 12/2009 | Krausz | |
| 7,654,586 B2 | 2/2010 | Krausz | |
| 7,748,753 B2 | 7/2010 | Krausz | |
| 7,837,238 B2 | 11/2010 | Krausz | |
| 7,883,126 B2 | 2/2011 | Terry et al. | |
| 7,997,626 B2 | 8/2011 | Krausz | |
| 7,997,628 B1 | 8/2011 | Smith, Jr. | |
| 8,042,816 B2 | 10/2011 | Krausz | |
| 8,313,124 B2 | 11/2012 | Krausz | |
| 8,408,606 B2 | 4/2013 | Krausz | |
| 8,651,530 B2 | 2/2014 | Krausz | |
| 8,857,861 B2 | 10/2014 | German | |
| 8,870,189 B2 | 10/2014 | Krausz | |
| 8,960,683 B2 | 2/2015 | Krausz | |
| 8,960,729 B2 | 2/2015 | Chiproot | |
| D724,185 S | 3/2015 | Chiproot | |
| 9,086,177 B2 | 7/2015 | Artsiely | |
| 9,163,760 B2 | 10/2015 | Lundstrom et al. | |
| 10,677,381 B2 | 6/2020 | Furcoiu | |
| 10,774,508 B2 | 9/2020 | Furcoiu et al. | |
| 2002/0017789 A1 | 2/2002 | Holmes | |
| 2002/0037194 A1 | 3/2002 | Gentile | |
| 2003/0085566 A1 | 5/2003 | Rex et al. | |
| 2004/0108713 A1 | 6/2004 | Krausz | |
| 2004/0232698 A1 | 11/2004 | Jones | |
| 2005/0253380 A1 | 11/2005 | Gibb et al. | |
| 2006/0012172 A1 | 1/2006 | Kennedy | |
| 2006/0087121 A1 | 4/2006 | Bradley | |
| 2007/0108766 A1 | 5/2007 | Riordan et al. | |
| 2007/0295406 A1 | 12/2007 | German et al. | |
| 2009/0243289 A1 | 10/2009 | Madara et al. | |
| 2010/0289256 A1 | 11/2010 | Shumard | |
| 2011/0084484 A1 | 4/2011 | German et al. | |
| 2011/0095519 A1 | 4/2011 | Krausz | |
| 2011/0291409 A1 | 12/2011 | Kennedy, Jr. et al. | |
| 2012/0025524 A1 | 2/2012 | Krausz | |
| 2012/0119485 A1 | 5/2012 | Cichorek et al. | |
| 2012/0299294 A1 | 11/2012 | Chiproot | |
| 2012/0299295 A1 | 11/2012 | Chiproot | |
| 2013/0056980 A1 | 3/2013 | Chiproot | |
| 2013/0328305 A1 | 12/2013 | Chiproot | |
| 2014/0001709 A1 | 1/2014 | Chiproot | |
| 2014/0319781 A1 | 10/2014 | Chiproot | |
| 2014/0319826 A1 | 10/2014 | Chiproot | |
| 2015/0176728 A1 | 6/2015 | Bowman | |
| 2015/0204468 A1 | 7/2015 | Jones | |
| 2017/0130431 A1 | 5/2017 | Pinney et al. | |
| 2018/0306354 A1 | 10/2018 | Furcoiu | |
| 2018/0306361 A1 | 10/2018 | Furcoiu | |
| 2018/0306362 A1 | 10/2018 | Furcoiu | |
| 2019/0145565 A1 | 5/2019 | Furcoiu | |
| 2019/0264843 A1 | 8/2019 | Furcoiu | |
| 2019/0331265 A1 | 10/2019 | Bowman | |
| 2020/0025321 A1 | 1/2020 | Furcoiu | |
| 2020/0063900 A1 | 2/2020 | Furcoiu | |
| 2020/0071915 A1 | 3/2020 | Furcoiu et al. | |
| 2020/0248847 A1 | 8/2020 | Furcoiu | |
| 2020/0263814 A1 | 8/2020 | Furcoiu | |
| 2020/0354930 A1 | 11/2020 | Furcoiu et al. | |
| 2021/0018125 A1 | 1/2021 | Mitchell et al. | |

FOREIGN PATENT DOCUMENTS

| | | | |
|---|---|---|---|
| CN | 1894531 | 1/2007 | |
| CN | 202168185 | 3/2012 | |
| DE | 19837803 | 3/2000 | |
| DE | 202016100359 U1 * | 2/2016 | F16L 21/06 |
| EP | 0273999 | 7/1988 | |
| EP | 2463567 | 6/2012 | |
| EP | 2494249 | 9/2012 | |
| GB | 1311434 | 3/1973 | |
| GR | 3030125 | 7/1999 | |
| IL | 196511 | 1/2009 | |
| IL | 196817 | 2/2009 | |
| IL | 209936 | 12/2010 | |
| WO | 2004048835 | 6/2004 | |
| WO | 2011123865 | 10/2011 | |

(56) References Cited

FOREIGN PATENT DOCUMENTS

| WO | 2018194787 | 10/2018 |
|---|---|---|
| WO | 2019212771 | 11/2019 |
| WO | 2020040995 | 2/2020 |
| WO | 2020050954 | 3/2020 |
| WO | 2020146073 | 7/2020 |

OTHER PUBLICATIONS

Furcoiu, Aurelian Ioan; Requirement for Restriction/Election for U.S. Appl. No. 15/882,512, filed Jan. 29, 2018, dated Jul. 25, 2019, 8 pgs.

Furcoiu, Aurelian Ioan; International Search Report and Written Opinion for PCT Application No. PCT/US19/28339, filed Apr. 19, 2019, dated Jun. 26, 2019, 8 pgs.

Furcoiu, Aurelian Ioan; Non-Final Office Action for U.S. Appl No. 15/490,926, filed Apr. 19, 2017, dated Aug. 14, 2019, 30 pgs.

Mueller International, LLC; Presentation which includes descriptions and images of known restraint devices. The restraint devices were publicly available prior to Apr. 19, 2017, 39 pgs.

Furcoiu, Aurelian Ioan; International Search Report for PCT Application No. PCT/US18/23554, filed Mar. 21, 2018, dated Jun. 6, 2018, 10 pgs.

Furcoiu, Aurelian Ioan; Requirement for Restriction/Election for U.S. Appl. No. 15/966,796, filed Apr. 30, 2018, dated Sep. 27, 2019, 8 pgs.

Furcoiu, Aurelian Ioan; Non-Final Office Action for U.S. Appl. No. 16/121,132, filed Sep. 4, 2018, dated Nov. 12, 2019, 31 pgs.

Furcoiu, Aurelian Ioan; International Preliminary Report on Patentability for PCT Application No. PCT/US18/23554, filed Mar. 21, 2018, dated Oct. 31, 2019, 8 pgs.

Furcoiu, Aurelian Ioan; Invitation to Pay Additional Fees for PCT/US19/46085, filed Aug. 12, 2019, dated Oct. 9, 2019, 2 pgs.

Furcoiu, Aurelian Ioan; International Search Report and Written Opinion for PCT Application No. PCT/US19/45453, filed Aug. 7, 2019, dated Oct. 28, 2019, 9 pgs.

Furcoiu, Aurelian Ioan; Supplemental Notice of Allowance for U.S. Appl. No. 15/490,926, filed Apr. 19, 2017, dated Mar. 12, 2020, 9 pgs.

Furcoiu, Aurelian Ioan; Non-Final Office Action for U.S. Appl. No. 15/966,796, filed Apr. 20, 2018, dated Feb. 24, 2020, 40 pgs.

Furcoiu, Aurelian Ioan; Final Office Action for U.S. Appl. No. 16/121,132, filed Sep. 4, 2018, dated Apr. 20, 2020, 17 pgs.

Furcoiu, Aurelian Ioan; International Search Report and Written Opinion for PCT Application No. PCT/US19/65201, filed Dec. 9, 2019, dated Feb. 24, 2020, 10 pgs.

Furcoiu, Aurelian Ioan; Notice of Allowance for U.S. Appl. No. 15/490,926, filed Apr. 19, 2017, dated Feb. 12, 2020, 15 pgs.

Furcoiu, Aurelian Ioan; Non-Final Office Action for U.S. Appl. No. 15/882,512, filed Jan. 29, 2018, dated Dec. 12, 2019, 42 pgs.

Furcoiu, Aurelian Ioan; International Search Report and Written Opinion for PCT Application No. PCT/US19/46085, filed Aug. 12, 2019, dated Dec. 11, 2019, 13 pgs.

Mitchell, Timothy J.; International Search Report and Written Opinion for PCT Application No. PCT/US19/65337, filed Dec. 10, 2019, dated Feb. 5, 2020, 9 pgs.

Furcoiu, Aurelian Ioan; Supplemental Notice of Allowance for U.S. Appl. No. 15/490,926, filed Apr. 19, 2017, dated May 14, 2020, 7 pgs.

Furcoiu, Aurelian Ioan; Non-Final Office Action for U.S. Appl. No. 15/882,512, filed Jan. 29, 2018, dated Jun. 26, 2020, 20 pgs.

Furcoiu, Aurelian Ioan; Non-Final Office Action for U.S. Appl. No. 15/908,096, filed Feb. 28, 2018, dated Jun. 18, 2020, 54 pgs.

Furcoiu, Aurelian Ioan; Notice of Allowance for U.S. Appl. No. 16/121,132, filed Sep. 4, 2018, dated Jun. 12, 2020, 9 pgs.

Furcoiu, Aurelian Ioan; Non-Final Office Action for U.S. Appl. No. 15/966,796, filed Apr. 30, 2018, dated Sep. 3, 2020, 19 pgs.

Furcoiu, Aurelian Ioan; Corrected Notice of Allowance for U.S. Appl. No. 16/121,132, filed Sep. 4, 2018, dated Aug. 12, 2020, 8 pgs.

Furcoiu, Aurelian Ioan; Non-Final Office Action for U.S. Appl. No. 16/242,059, filed Jan. 8, 2019, dated Nov. 20, 2020, 52 pgs.

Furcoiu, Aurelian Ioan; Requirement for Restriction/Election for U.S. Appl. No. 16/109,204, filed Aug. 22, 2018, dated Oct. 27, 2020, 6 pgs.

Furcoiu, Aurelian Ioan; International Preliminary Report on Patentability for PCT Application No. PCT/US19/28339, filed Apr. 19, 2019, dated Nov. 12, 2020, 7 pgs.

Furcoiu, Aurelian Ioan; Non-Final Office Action for U.S. Appl. No. 15/908,096, filed Feb. 28, 2018, dated Dec. 15, 2020, 23 pgs.

Furcoiu, Aurelian Ioan; Non-Final Office Action for U.S. Appl. No. 16/109,204, filed Aug. 22, 2018, dated Dec. 22, 2020, 65 pgs.

Furcoiu, Aurelian Ioan; Non-Final Office Action for European patent application No. 18787054.8, dated Dec. 22, 2020, 3 pgs.

Furcoiu, Aurelian Ioan; Office Action for Chinese patent application No. 201880026432.6, file Mar. 21, 2018, dated Nov. 4, 2020, 13 pgs.

\* cited by examiner

WIDE RANGE COUPLING

TECHNICAL FIELD

This disclosure relates to pipe couplings. More specifically, this disclosure relates to a pipe coupling for use with a wide range of pipe diameters.

BACKGROUND

Pipe couplings are commonly used to connect two pipe lengths together to form a pipe connection assembly, such as when installing a pipe system or pipe infrastructure. Some pipe couplings can be time consuming or difficult to install. For example, some pipe couplings require tightening of numerous bolts around the pipe coupling. The bolts often must be tightened in a pattern, such as a star pattern, to ensure that pressure from the bolts is evenly distributed over the pipe connection assembly to provide for a reliable and uniform seal. Uneven tightening of the bolts can cause a poor seal and leaking of the pipe connection assembly. Limited access, such as when installing a pipe connection assembly in a trench, can also make it difficult to access each of the individual bolts for tightening.

Additionally, many pipe couplings and gaskets of the pipe couplings can only accommodate a narrow range of pipe sizes. For example, a pipe coupling or gasket manufactured to American Society of Mechanical Engineers (ASME) standards may not be compatible with a pipe length manufactured to Japanese Industrial Standards (JIS). A 6" nominal pipe length manufactured to JIS can define an outside diameter of 165.2 mm while a 6" nominal pipe length manufactured to ASME standards can define an outside diameter of 168.3 mm. Many common pipe couplings and gaskets cannot tolerate the range of outside diameters between standards, nominal pipe sizes, excessive manufacturing tolerance, or ovality of the pipe lengths without developing leaks or failing to seal.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a wide range coupling comprising a body, the body defining a first body end and a second body end, the body defining a body bore extending through the body from the first body end to the second body end, the body bore defining an axis, the body defining a body shoulder disposed at the first body end, the body shoulder extending radially inward into the body bore; and an end ring, the end ring positioned over the first body end, the end ring defining a ring shoulder extending radially inward towards the body; and a gasket connected to the end ring, the gasket disposed within the body bore, the gasket defining a radially outer lip and a radially inner lip, the radially outer lip forming a seal with the body, the end ring and the gasket configured to axially travel along the axis relative to the body, the end ring and the gasket selectively positionable about and between an engaged position and a disengaged position.

Also disclosed is a pipe connection assembly comprising a pipe length, the pipe length defining an inner surface and an outer surface, the inner surface defining a pipe bore; and a wide range coupling, the wide range coupling comprising a body, the body defining a first body end and a second body end, the body defining a body bore extending through the body from the first body end to the second body end, the body bore defining an axis; an end ring, the end ring positioned over the first body end, the end ring configured to axially telescope relative to the body; and a gasket connected to the end ring, the gasket disposed within the body bore, the gasket defining a radially outer lip and a radially inner lip, the radially outer lip forming a seal with the body, the radially inner lip forming a seal with the outer surface of the pipe length with the end ring and the gasket positioned in an engaged position, the gasket sealing the body bore in fluid communication with the pipe bore.

Also disclosed is a method of connecting a pipe length to a wide range coupling, the method comprising inserting a first pipe end of the pipe length into a body bore defined by a body of the wide range coupling; contacting the first pipe end with a radially inner lip of a gasket, the gasket disposed within the body bore; drawing the radially inner lip of the gasket over the first pipe end; forming a seal between the radially inner lip of the gasket and an outer surface of the pipe length; and forming a seal between a radially outer lip of the gasket and the body bore of the body.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
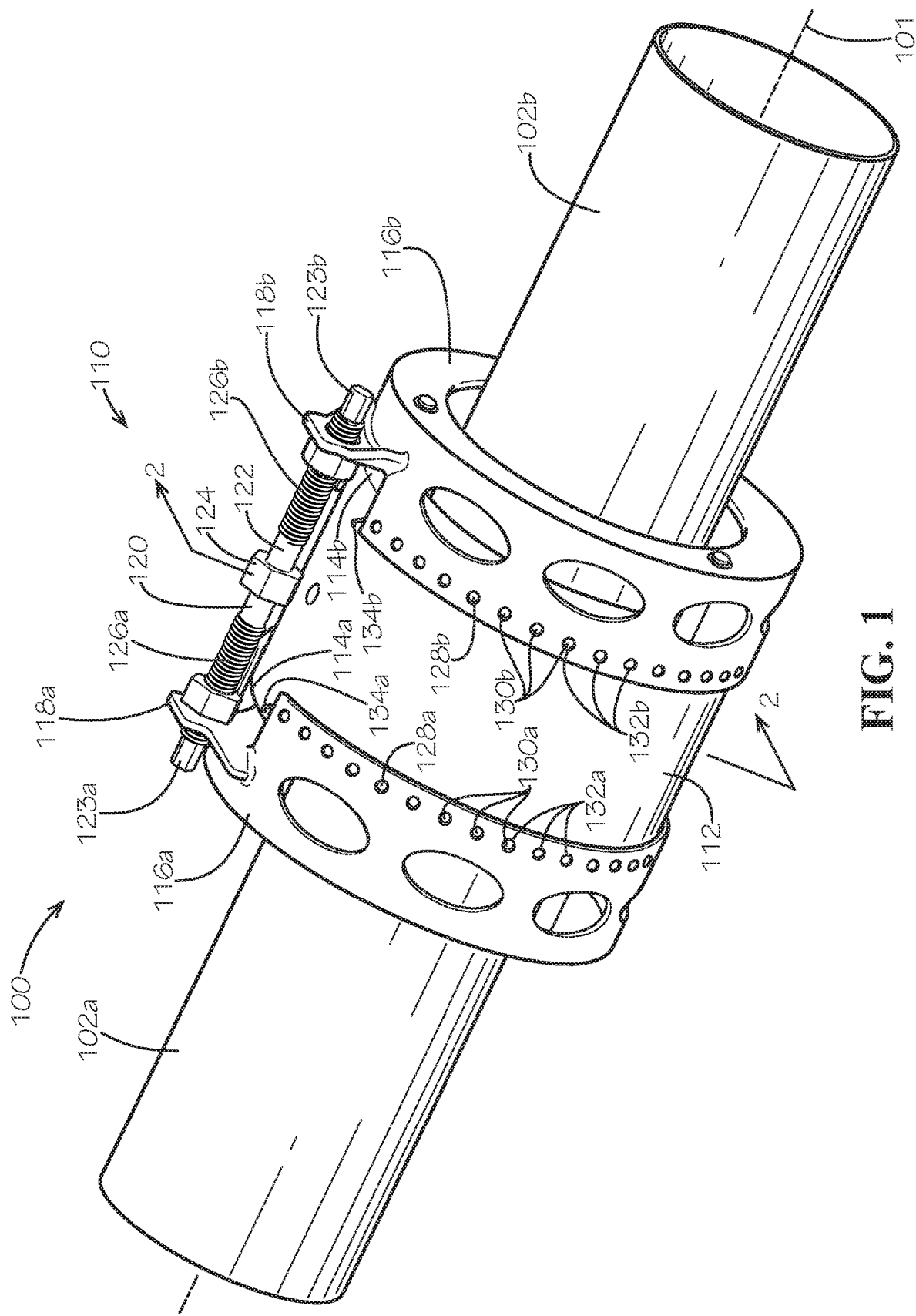
FIG. 1 is a perspective view of a pipe connection assembly in accordance with one aspect of the present disclosure, the pipe connection assembly comprising a first pipe length, a second pipe length, and a wide range coupling shown in an engaged position.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a wide range coupling and associated methods, systems, devices, and various apparatus. The wide range coupling can comprise a body, a first end ring, a second end ring, a first gasket, and a second gasket. It would be understood by one of skill in the art that the disclosed wide range coupling is described in but a few exemplary embodiments among many. No particular terminology or description should be considered limiting on the disclosure or the scope of any claims issuing therefrom.

FIG. 1 shows a perspective view of a pipe connection assembly 100 which can comprise a first pipe length 102a, a second pipe length 102b, and a wide range coupling 110. In the present aspect shown in FIG. 1, the wide range coupling 110 can be in an engaged position. The pipe lengths 102a,b are shown as short lengths of pipe for exemplary purposes; however, the length of each pipe length 102a,b is not limiting. The wide range coupling 110 can comprise a body 112, a first end ring 116a, a second end ring 116b, and a spreader mechanism 120. The body 112 can define a first body end 114a and a second body end 114b, and the first body end 114a can be disposed opposite from the second body end 114b on the body 112.

The first end ring 116a can be positioned over the first body end 114a, and the second end ring 116b can be positioned over the second body end 114b. The first end ring 116a and the second end ring 116b can each mechanically engage the spreader mechanism 120. The end rings 116a,b can each be configured to axially telescope inwards and outwards along the body 112 relative to an axis 101 of the body 112. The spreader mechanism 120 can be configured to control the telescoping of the end rings 116*a,b* along the body 112.

In the present aspect, the spreader mechanism 120 can comprise a jack bolt 122. The jack bolt 122 can comprise a first side 123*a*, a second side 123*b*, and a hex portion 124 positioned between the first side 123*a* and the second side 123*b*. The first side 123*a* can define a first threaded portion 126*a*, and the second side 123*b* can define a second threaded portion 126*b*. The first threaded portion 126*a* can be threaded opposite from the second threaded portion 126*b*. For example and without limitation, the first threaded portion 126*a* can be a right-hand thread, and the second threaded portion 126*b* can be a left-hand thread. In other aspects, the first threaded portion 126*a* can be a left-hand thread, and the second threaded portion 126*b* can be a right-hand thread.

The first end ring 116*a* can comprise a first spreader bracket 118*a* which can receive the first side 123*a* of the jack bolt 122. The first spreader bracket 118*a* can be internally threaded complimentary to the first threaded portion 126*a* of the jack bolt 122, and the first spreader bracket 118*a* can threadedly engage the first threaded portion 126*a* of the jack bolt 122. For example and without limitation, the first spreader bracket 118*a* can define internal right-hand threads.

The second end ring 116*b* can comprise a second spreader bracket 118*b* which can receive the second side 123*b* of the jack bolt 122. The second spreader bracket 118*b* can be internally threaded complimentary to the second threaded portion 126*b* of the jack bolt 122, and the second spreader bracket 118*b* can threadedly engage the second threaded portion 126*b* of the jack bolt 122. For example and without limitation, the second spreader bracket 118*b* can define internal left-hand threads.

Because of the opposite threading patterns of the first threaded portion 126*a* and the second threaded portion 126*b*, rotating the jack bolt 122 in an engagement direction can axially telescope the first end ring 116*a* and the second end ring 116*b* outward along the axis 101 relative to the body 112 and away from one another. For example and without limitation, in the present aspect, the engagement direction can be a clockwise rotational direction when the wide range coupling 110 is viewed facing the first end ring 116*a*. Rotating the jack bolt 122 in a disengagement direction, opposite from the engagement direction, can axially telescope the first end ring 116*a* and the second end ring 116*b* inwards along the axis 101 relative to the body 112 and towards one another. A user can rotate the jack bolt 122 by turning the hex portion 124 with a tool, such as a wrench.

In the present aspect, the jack bolt 122 may not be axially restrained relative to the axis 101; however, in other aspects, the jack bolt 122 can be axially restrained. For example, in some aspects, the hex portion 124 can be axially restrained between a pair of body ears (not shown) which can extend radially outward from the body 112. Each of the body ears can define a slot or hole, and the first side 123*a* and the second side 123*b* can extend through the respective slots or holes, thereby securing the hex portion 124 between the body ears. In the present aspect, the spreader mechanism 120 and the end rings 116*a,b* can be rotationally restrained about the axis 101 relative to the body 112. In other aspects, the spreader mechanism 120 and the end rings 116*a,b* may not be rotationally restrained.

The wide range coupling 110 can further comprise a first bearing 128*a* and a second bearing 128*b*. The first bearing 128*a* can be captured between the body 112 and the first end ring 116*a*. The second bearing 128*b* can be captured between the body 112 and the second end ring 116*b*. The bearings 128*a,b* can be configured to reduce friction and prevent binding between the respective end rings 116*a,b* and the body 112 when the end rings 116*a,b* axially telescope along the body 112.

The first bearing 128*a* can comprise a plurality of ball bearings 130*a*. In the present aspect, the ball bearings 130*a* can be retained on a wire 134*a* which can extend circumferentially around the body 112 proximate to the first body end 114*a*. The first end ring 116*a* can define a plurality of circumferentially spaced bearing apertures 132*a*. Each of the ball bearings 130*a* can be positioned within a different one of the bearing apertures 132*a*. The wire 134*a* can extend through each of the ball bearings 130*a* in a substantially circumferential direction, and the ball bearings 130*a* can roll along the body 112 in an axial direction.

The second bearing 128*b* can comprise a plurality of ball bearings 130*b*. In the present aspect, the ball bearings 130*b* can be retained on a wire 134*b* which can extend circumferentially around the body 112 proximate to the second body end 114*b*. The second end ring 116*b* can define a plurality of circumferentially spaced bearing apertures 132*b*. Each of the ball bearings 130*b* can be positioned within a different one of the bearing apertures 132*b*. The wire 134*b* can extend through each of the ball bearings 130*b* in a substantially circumferential direction, and the ball bearings 130*b* can roll along the body 112 in an axial direction.

Figure 2:
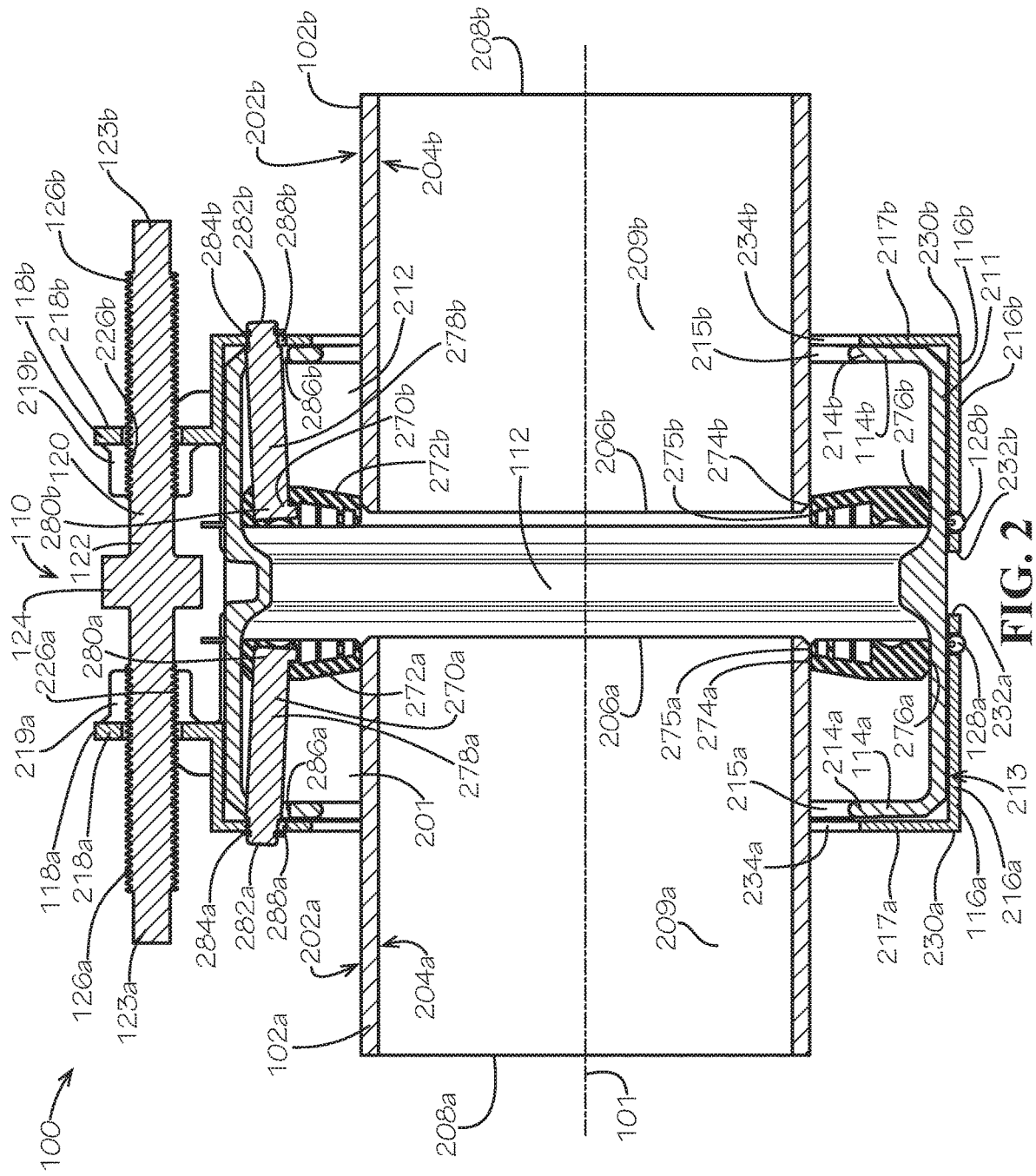
FIG. 2 is cross-sectional view of the pipe connection assembly of FIG. 1 with the wide range coupling in a disengaged position taken along line 2-2 shown in FIG. 1.

FIG. 2 is a cross-section of the pipe connection assembly 100 taken along line 2-2 shown in FIG. 1. In the aspect shown, the wide range coupling 110 can be in a disengaged position rather than the engaged position shown in FIG. 1. The first pipe length 102*a* can define an inner surface 204*a* and an outer surface 202*a*. The first pipe length 102*a* can define a first pipe end 206*a* and a second pipe end 208*a*. The first pipe end 206*a* can be disposed opposite from the second pipe end 208*a*. The inner surface 204*a* of the first pipe length 102*a* can define a first pipe bore 209*a* extending through the first pipe length 102*a* from the first pipe end 206*a* to the second pipe end 208*a*. The first pipe bore 209*a* can be coaxial to the axis 101.

The second pipe length 102*b* can define an inner surface 204*b* and an outer surface 202*b*. The second pipe length 102*b* can define a first pipe end 206*b* and a second pipe end 208*b*. The first pipe end 206*b* can be disposed opposite from the second pipe end 208*b*. The inner surface 204*b* of the second pipe length 102*b* can define a second pipe bore 209*b* extending through the second pipe length 102*b* from the first pipe end 206*b* to the second pipe end 208*b*. The second pipe bore 209*b* can be coaxial to the axis 101.

The body 112 can define an inner surface 212 and an outer surface 213. The inner surface 212 can define a body bore 201 extending through the body 112 from the first body end 114*a* to the second body end 114*b*. The body bore 201 can define the axis 101. The body 112 can define an annular body wall 211, a first body shoulder 214*a*, and a second body shoulder 214*b*. The annular body wall 211 can extend from the first body end 114*a* to the second body end 114*b*. The annular body wall 211 can be substantially tubular in shape. The first body shoulder 214*a* can be disposed at the first body end 114*a*, and the first body shoulder 214*a* can extend radially inward into the body bore 201 with respect to the axis 101. A radially inner portion of the first body shoulder 214*a* can define a first body aperture 215*a* of the body bore 201. The second body shoulder 214*b* can be disposed at the second body end 114*b*, and the second body shoulder 214*b* can extend radially inward into the body bore 201 with respect to the axis 101. A radially inner portion of the second body shoulder 214b can define a second body aperture 215b of the body bore 201.

The first end ring 116a can define a first annular ring wall 216a and a first ring shoulder 217a. The first annular ring wall 216a can extend around a portion of the annular body wall 211 disposed proximate to the first body end 114a. The first annular ring wall 216a can be disposed radially outward from the annular body wall 211, and the first bearing 128a can be captured between the first annular ring wall 216a and the annular body wall 211. The first annular ring wall 216a can define an outer ring side 230a and an inner ring side 232a. The inner ring side 232a can be disposed axially inward from the outer ring side 230a relative to the axis 101. The outer ring side 230a can extend axially outwards beyond the first body end 114a of the body 112. The first ring shoulder 217a can be defined proximate to the outer ring side 230a, and the first ring shoulder 217a can extend radially inward from first annular ring wall 216a. A radially inner portion of the first ring shoulder 217a can define a first ring aperture 234a. In the present aspect, the first ring aperture 234a can be disposed radially outward from the first body aperture 215a; however in other aspects, the first ring aperture 234a can be disposed radially inward or flush with the first body aperture 215a.

The second end ring 116b can define a second annular ring wall 216b and a second ring shoulder 217b. The second annular ring wall 216b can extend around a portion of the annular body wall 211 disposed proximate to the second body end 114b, and the second bearing 128b can be captured between the second annular ring wall 216b and the annular body wall 211. The second annular ring wall 216b can be disposed radially outward from the annular body wall 211. The second annular ring wall 216b can define an outer ring side 230b and an inner ring side 232b. The inner ring side 232b can be disposed axially inward from the outer ring side 230b relative to the axis 101. The outer ring side 230b can extend axially outwards beyond the second body end 114b of the body 112. The second ring shoulder 217b can be defined proximate to the outer ring side 230b, and the second ring shoulder 217b can extend radially inward from second annular ring wall 216b. A radially inner portion of the second ring shoulder 217b can define a second ring aperture 234b. In the present aspect, the second ring aperture 234b can be disposed radially outward from the second body aperture 215b; however in other aspects, the second ring aperture 234b can be disposed radially inward or flush with the second body aperture 215b.

The first spreader bracket 118a can be attached to the first annular ring wall 216a, and the first spreader bracket 118a can extend radially outward from the first end ring 116a. The second spreader bracket 118b can be attached to the second annular ring wall 216b, and the second spreader bracket 118b can extend radially outward from the second end ring 116b. Each spreader bracket 118a,b can respectively comprise a base 218a,b and a nut 219a,b. In the present aspect, each base 218a,b can be welded to the respective end ring 116a,b; however in other aspects, the bases 218a,b can be monolithically formed with the respective end ring 116a,b or fastened with any other known mechanism. Each nut 219a,b can be welded to the respective base 218a,b; however, in other aspects, the spreader brackets 118a,b may not comprise the nuts 219a,b. In such aspects, the bases 218a,b can each define internal threads.

In the present aspect, the nuts 219a,b can each define internal threading 226a,b formed complimentary to the adjacent threaded portions 126a,b of the jack bolt 122. For example, in the present aspect, the internal threading 226a can be internal right-hand threads configured to threadedly engage the external right-hand threads of the first threaded portion 126a, and the internal threading 226b can be internal left-hand threads configured to threadedly engage the external left-hand threads of the second threaded portion 126b.

The wide range coupling 110 can further comprise a first gasket assembly 270a and a second gasket assembly 270b. The first gasket assembly 270a can be substantially axially fixed relative to the first end ring 116a, and the second gasket assembly 270b can be substantially axially fixed relative to the second end ring 116b. The first gasket assembly 270a can comprise a first gasket 272a and one or more first connectors. The first connectors, as represented by a first connector 278a, can each define a first connector end 282a and a second connector end 280a. The second connector end 280a can be attached to the first gasket 272a. In the present aspect, the second connector end 280a can be embedded within the first gasket 272a.

The first connector end 282a can engage the first end ring 116a. The first ring shoulder 217a can define one or more ring connector openings, as represented by a ring connector opening 288a, and the first body shoulder 214a can define one or more body connector openings, as represented by a body connector opening 286a. The body connector opening 286a can align with the ring connector opening 288a, and the first connector end 282a can extend through the body connector opening 286a and the ring connector opening 288a. A fastener, such as a spring clip 284a, can be attached to the first connector end 282a to prevent withdrawal of the first connector end 282a through the ring connector opening 288a. By extending through the body connector opening 286a and the ring connector opening 288a, the first connector 278a can limit rotation of the first end ring 116a relative to the body 112 about the axis 101.

The first connector 278a can extend axially inward from the first end ring 116a into the body bore 201. In the present aspect, the first connector 278a can define an angled orientation relative to the axis 101. The first connector 278a can extend radially and axially inward from the first connector end 282a to the second connector end 280a relative to the axis 101 in part because the ring connector opening 288a can be positioned radially outward from the body connector opening 286a with respect to the axis 101. In other aspects, the first connector 278a can be oriented substantially parallel to the axis 101, and the first connector 278a may not extend radially inward or outward from the first connector end 282a to the second connector end 280a. In other aspects, the first connector 278a can extend radially outward and axially inward from the first connector end 282a to the second connector end 280a relative to the axis 101.

The first gasket 272a can be disposed within the body bore 201. The first gasket 272a can be shaped as an annular ring. The first gasket 272a can define a radially inner lip 274a and a radially outer lip 276a. The radially inner lip 274a can define a gasket bore 275a of the first gasket 272a. In the present aspect, the second connector end 280a can be embedded within the first gasket 272a proximate to the radially outer lip 276a. In other aspects, the second connector end 280a can extend through the first gasket 272a.

The second gasket assembly 270b can comprise a second gasket 272b and one or more second connectors. The second connectors, as represented by a second connector 278b, can each define a first connector end 282b and a second connector end 280b. The second connector end 280b can be attached to the second gasket 272b. In the present aspect, the second connector end 280b can be embedded within the second gasket 272b.

The first connector end 282b can engage the second end ring 116b. The second ring shoulder 217b can define one or more ring connector openings, as represented by a ring connector opening 288b, and the second body shoulder 214b can define one or more body connector openings, as represented by a body connector opening 286b. The body connector opening 286b can align with the ring connector opening 288b, and the first connector end 282b can extend through the body connector opening 286b and the ring connector opening 288b. A fastener, such as a spring clip 284b, can be attached to the first connector end 282b to prevent withdrawal of the first connector end 282b through the ring connector opening 288b. By extending through the body connector opening 286b and the ring connector opening 288b, the second connector 278b can limit rotation of the second end ring 116b relative to the body 112 about the axis 101.

The second connector 278b can extend axially inward from the second end ring 116b into the body bore 201. In the present aspect, the second connector 278b can define the angled orientation relative to the axis 101. The second connector 278b can extend radially and axially inward from the first connector end 282b to the second connector end 280b relative to the axis 101 in part because the ring connector opening 288b can be positioned radially outward from the body connector opening 286b with respect to the axis 101. In other aspects, the second connector 278b can be oriented substantially parallel to the axis 101, and the second connector 278b may not extend radially inward or outward from the first connector end 282b to the second connector end 280b. In other aspects, the second connector 278b can extend radially outward and axially inward from the first connector end 282b to the second connector end 280b relative to the axis 101.

The second gasket 272b can be disposed within the body bore 201. The second gasket 272b can be shaped as an annular ring. The second gasket 272b can define a radially inner lip 274b and a radially outer lip 276b. The radially inner lip 274b can define a gasket bore 275b of the second gasket 272b. In the present aspect, the second connector end 280b can be embedded within the second gasket 272b proximate to the radially outer lip 276b. In other aspects, the second connector end 280b can extend through the second gasket 272b.

As previously stated, the wide range coupling 110 is shown in the disengaged position in FIG. 2. In the disengaged position, the first pipe ends 206a,b of the pipe lengths 102a,b extend through the respective body apertures 215a,b and ring apertures 234a,b, and the first pipe ends 206a,b contact the radially inner lips 274a,b of the gaskets 272a,b, respectively, in the aspect shown. In other aspects, either or both of the gaskets 272a,b may not contact the respective pipe length 102a,b in the disengaged position. In the disengaged position, the end rings 116a,b and gasket assemblies 270a,b can be positioned in an axially innermost position, and in the present aspect, the ring shoulders 217a,b can contact the adjacent body shoulders 214a,b, respectively.

In the present aspect, the first pipe ends 206a,b can be positioned within the gasket bores 275a,b of the gaskets 272a,b, respectively, in the disengaged position. In some aspects, such as when the pipe lengths 102a,b exceed the gasket bores 275a,b in diameter by a significant margin, the first pipe ends 206a,b may not be positioned within the gasket bores 275a,b in the disengaged position. In such aspects, contact between the first pipe ends 206a,b can deflect the radially inner lips 274a,b axially inward towards one another. In such aspect, telescoping the end rings 116a,b axially outwards can draw the gaskets 272a,b and stretch the radially inner lips 274a,b over the first pipe ends 206a,b, respectively.

Once the radially inner lips 274a,b are stretched over the first pipe ends 206a,b, the radially inner lips 274a,b can form a seal with the outer surfaces 202a,b of the pipe lengths 102a,b, respectively, and the radially outer lips 276a,b can from a seal with the body bore 201 of the body 112. The gaskets 272a,b can be compressed between the outer surfaces 202a,b of the respective pipe lengths 102a,b and the body bore 201 of the body 112.

Figure 3:
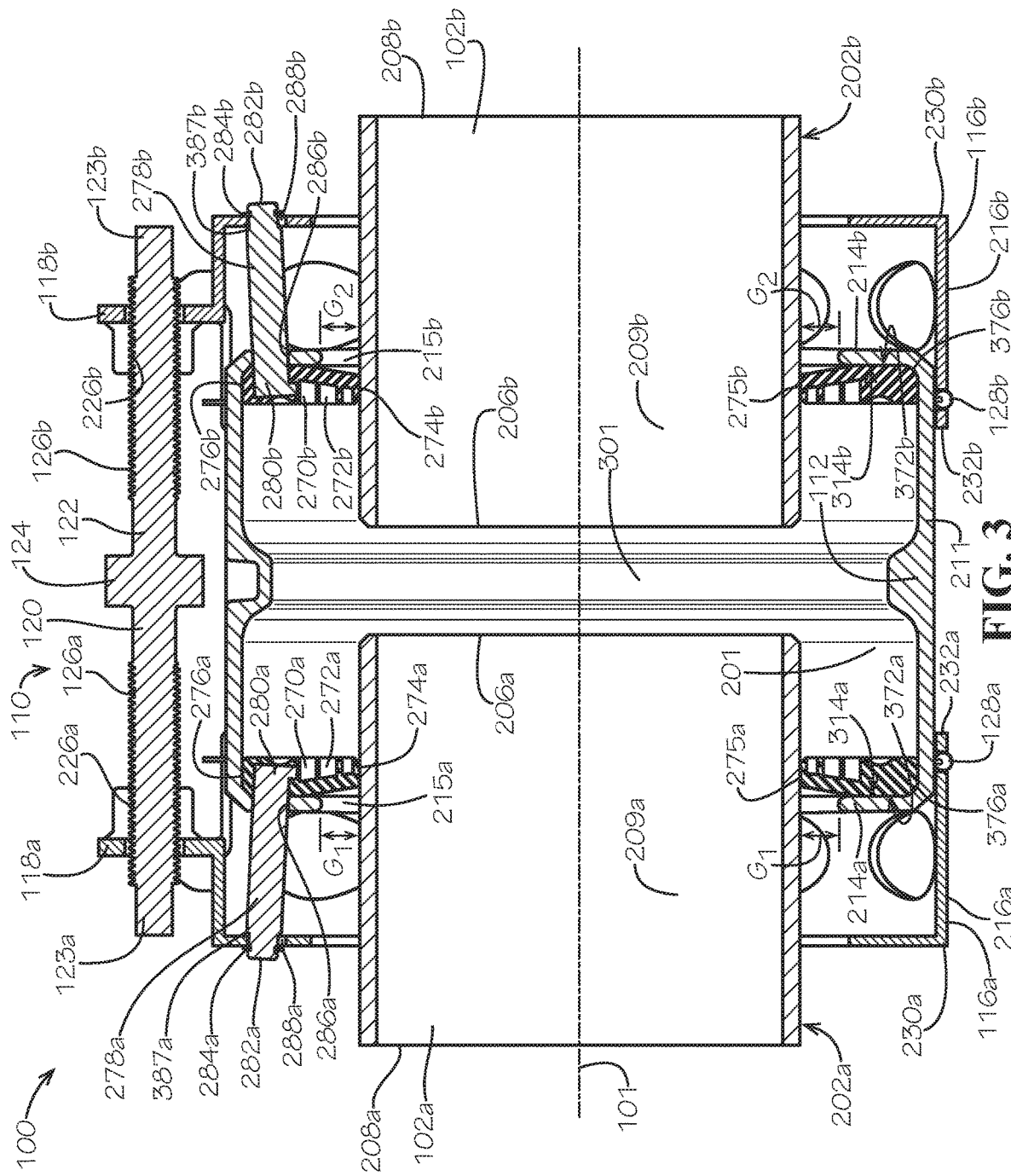
FIG. 3 is a cross-sectional view of the pipe connection assembly of FIG. 1 with the wide range coupling in the engaged position taken along line 2-2 shown in FIG. 1.

FIG. 3 is a cross-section of the pipe connection assembly 100 taken along line 2-2 shown in FIG. 1. In the aspect shown, the wide range coupling 110 can be in the engaged position shown in FIG. 1. The wide range coupling 110 can be actuated about and between the engaged position and the disengaged position by the spreader mechanism 120. By rotating the hex portion 124 of the spreader mechanism 120 in the engagement direction, the threaded portions 126a,b of the hex portion 124 drive the spreader brackets 118a,b and the end rings 116a,b axially outwards relative to the axis 101, thereby causing the end rings 116a,b to telescope axially outwards along outer surface 213 of the body 112. In the current aspect, the hex portion 124 is shaped similar to a hex-shaped nut. In other aspects, the spreader mechanism 120 can define a different shaped portion 124 that can be rotated using a tool, such as a hole defined through the jack bolt 122 that can be rotating by inserting a rod therethrough and moving the rod to rotate the jack bolt 122. In other aspects, the jack bolt 122 can be rotated from either end of the jack bolt 122 instead of between the sides 123a,b of the jack bolt 122.

In the engaged position, the end rings 116a,b can be positioned in an axially outermost position relative to the body 112. The outer ring sides 230a,b can extend axially outwards beyond the body 112, and the inner ring sides 232a,b and the bearings 128a,b can remain positioned around the body ends 114a,b, respectively, of the body 112. The bearings 128a,b can be configured to roll and reduce friction between the annular ring walls 216a,b and the annular body wall 211 when the end rings 116a,b telescope along the body 112. The bearings 128a,b can also be configured to prevent tilting of the end rings 116a,b relative to the body 112 which can cause binding between the end rings 116a,b and the body 112. In other aspects, the wide range coupling 110 can comprise a second spreader mechanism 120 or a guide rod assembly (not shown) positioned across the axis 101 and opposite from the spreader mechanism 120 in order to prevent tilting and binding of the end rings 116a,b relative to the body 112.

The axially outward telescoping of the end rings 116a,b along the body 112 can also telescope the respective gasket assemblies 270a,b axially outward within the body bore 201. The spring clips 284 of the first connector ends 282a,b can respectively engage the ring shoulders 217a,b, thereby telescoping the gasket assemblies 270a,b outwards in unison with the adjacent end rings 116a,b. In the engaged position, the first connector ends 282a,b can extend through the ring openings 288a,b, respectively, and the second connector ends 280a,b can extend through the body openings 286a,b, respectively.

The outward telescoping of the end rings 116a,b relative to the body 112 can be limited by contact between the gaskets 272a,b and the body shoulders 214a,b, respectively.

Each gasket 272a,b can define an axially outer gasket surface 372a,b which can be respectively engaged with an axially inner shoulder surface 314a,b defined by the body shoulders 214a,b. By rotating the jack bolt 122 in the engagement direction until snug, the axially outer gasket surface 372a,b can be compressed with the adjacent axially inner shoulder surface 314a,b to form a seal between the gasket 272a,b and the adjacent body shoulder 214a,b.

A rounded transition surface 376a can be defined between the annular body wall 211 and the first body shoulder 214a, and a rounded transition surface 376b can be defined between the annular body wall 211 and the second body shoulder 214b. The rounded transition surfaces 376a,b can be configured to deform the radially outer lips 276a,b of the respective gaskets 272a,b when the wide range coupling 110 is in the engaged position. The rounded transition surfaces 376a,b can cooperate with the angled orientation of the connectors 278a,b which apply a tensile force on the respective gaskets 272a,b axially and radially outward relative to the axis 101 in order to deform the radially outer lips 276a,b, respectively, and to provide a better seal with the body bore 201. The deformation of the radially outer lips 276a,b can further compress the gasket 272a,b and energize the seals formed between the radially outer lips 276a,b and the body bore 201 as well as the seals formed between the axially inner shoulder surfaces 314a,b and the respective axially outer gaskets surfaces 372a,b. In some aspects, the body bore 201 can taper towards the body shoulders 214a,b to further compress the gaskets 272a,b between the body bore 201 of the body 112 and the outer surfaces 202a,b of the pipe lengths 102a,b.

Rotating the jack bolt 122 in the disengagement direction can telescope the end rings 116a,b and the gasket assemblies 270a,b axially inward along the body 112. Each connector 278a,b can define a stepped shoulder 387a,b, respectively, disposed proximate to the first connector ends 282a,b. The stepped shoulders 387a,b can be sized larger than the ring openings 288a,b, thereby preventing the ring openings 288a,b from passing over the stepped shoulders 387a,b and travelling down the connectors 278a,b towards the second connector ends 280a,b. Consequently, when the end rings 116a,b are telescoped axially inwards, engagement between the stepped shoulders 387a,b and the ring shoulders 217a,b causes the gasket assemblies 270a,b to telescope axially inward in unison with the end rings 116a,b. In some aspects, lock nuts (not shown) can be placed over the sides 123a,b of the jack bolt 122 and threadedly engaged with the threaded portions 126a,b. The lock nuts can be tightened against the spreader brackets 118a,b to prevent further movement of the spreader mechanism 120, such as to prevent disengagement of the wide range coupling 110 once placed in the engaged position.

With the wide range coupling 110 secured in the engaged position, the first pipe length 102a, the first gasket 272a, the body 112, the second gasket 272b, and the second pipe length 102b can define a sealed cavity 301. The sealed cavity 301 can connect the first pipe bore 209a in fluid communication with the second pipe bore 209b, thereby coupling the first pipe length 102a to the second pipe length 102b.

The ability of the radially inner lip 274a,b of the gaskets 272a,b to stretch over the pipe ends 206a,b allows the wide range coupling 110 to be compatible with a range of pipe diameters. In the present aspect, the gaskets 272a,b can be nominal 6" gaskets, and the gaskets 272a,b can be compatible with pipe lengths 102a,b defining an outer diameter between 6.5" to 7.6", for example and without limitation. In other aspects, the gaskets 272a,b can be a different size, such as a 2" to a 24" nominal size. The range of compatible pipe diameters allows the gaskets 272a,b to be used with different pipe lengths 102a,b manufactured to different standards or to be used with pipe lengths 102a,b of different nominal sizes. For example and without limitation, the nominal 6" gaskets of the wide range coupling 110 can couple a 6" nominal pipe to a 7" nominal pipe. The gaskets 272a,b can also reliably seal around pipe lengths 102a,b which are significantly out-of-round.

To allow for pipes lengths 102a,b of different nominal sizes, a gap $G_1$ is defined between the first body aperture 215a and the outer surface 202a of the first pipe length 102a. A gap $G_2$ is defined between the second body aperture 215b and the outer surface 202b of the second pipe length 102b. The radially inner lips 274a,b of the gaskets 272a,b can be sufficiently stiff and resilient to seal the gaps $G_1$, $G_2$ without deflecting axially outwards through the gaps $G_1$, $G_2$ when the sealed cavity 301 is pressurized, such as by a fluid.

Figure 4:
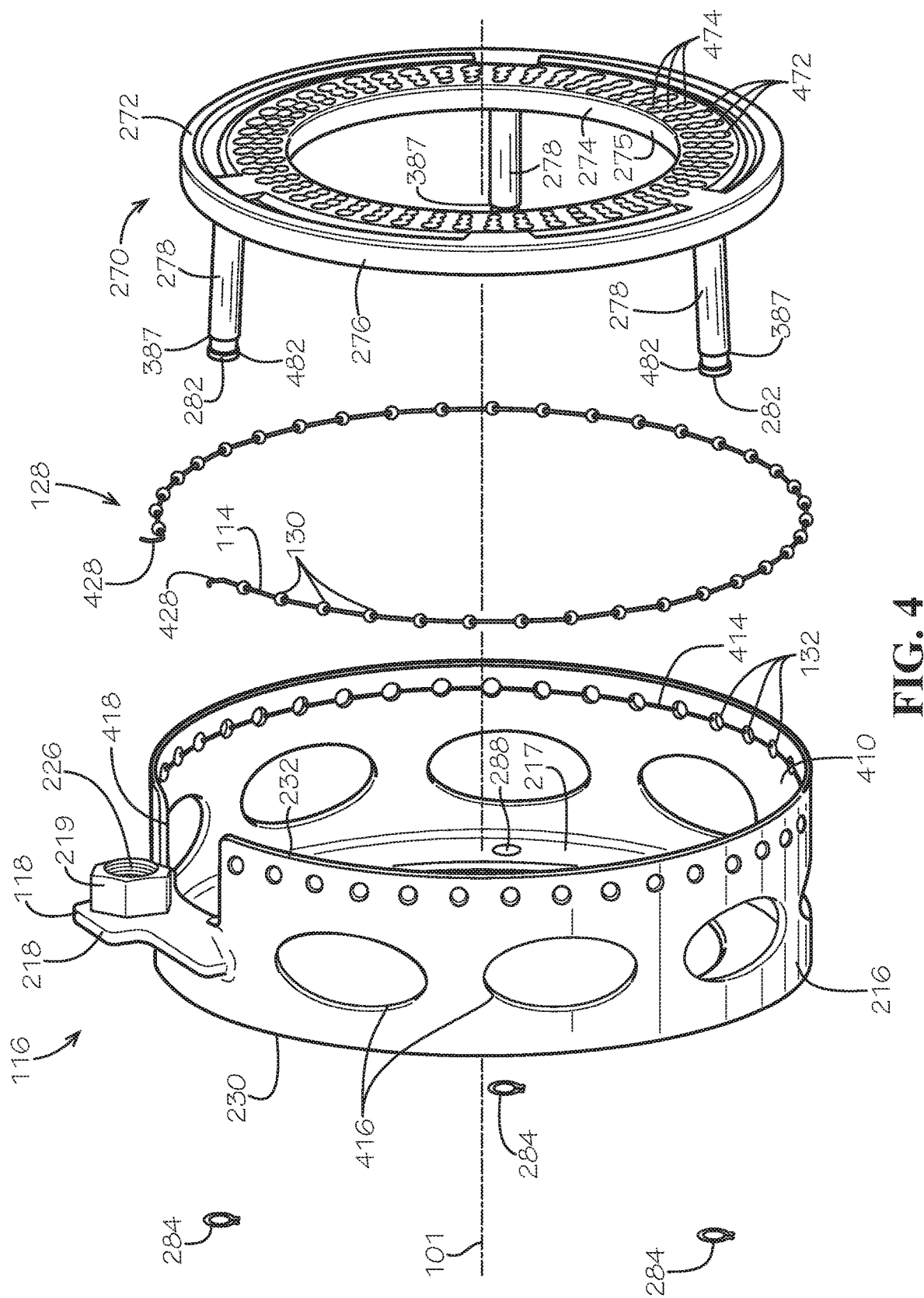
FIG. 4 is an exploded perspective view of a first end ring, a first bearing, and a first gasket assembly of the wide range coupling of FIG. 1.

FIG. 4 is an exploded perspective view of an end ring 116 such as the first end ring 116a and the second end ring 116b, a bearing 128 such as the first bearing 128a and the second bearing 128b, and a gasket assembly 270 such as the first gasket assembly 270a and the second gasket assembly 270b of the wide range coupling 110 of FIG. 1. In the present aspect, the first end ring 116a, the first bearing 128a, and the first gasket assembly 270a can also be representative of the second end ring 116b, the second bearing 128b, and the second gasket assembly 270b with the exception of the threading direction of the internal threading 226a,b which can be threaded opposite from one another.

The annular ring wall 216 can define an axially inner surface 410. A bearing groove 414 can be defined into the axially inner surface 410, and the bearing groove 414 can be configured to receive the bearing wire 114. Each of the ball bearings 130 can be received by a different one of the bearing apertures 132. In the present aspect, each of the bearing apertures 132 can be sized larger than the ball bearings 130, and the ball bearings 130 can freely spin on the bearing wire 114 within the bearing apertures 132. The bearing apertures 132 and the bearing groove 414 can axially fix the bearing 128 relative to the end ring 116. The end ring 116 can define a slot 418 extending from the inner ring side 232 axially outwards to the spreader bracket 118. The bearing wire 114 can define end hooks 428 which can be configured to engage the slot 418 to rotationally fix the bearing wire 114 relative to the end ring 116.

The end ring 116 can define a plurality of annular ring wall openings 416. The annular ring wall openings 416 can reduce a weight of each end ring 116 while also providing viewing access to the pipe length 102 (shown in FIG. 3) and the gasket assembly 270 (shown in FIG. 3) when the wide range coupling 110 (shown in FIG. 3) is in the engaged position. The annular ring wall openings 416 are oval-shaped in the current aspect. In other aspects, the annular ring wall openings 416 can define any desired shape, such as circles or squares.

Each of the connectors 278 can define a clip groove 482 disposed between the first connector end 282 and the stepped shoulder 387 of each respective connector 278. The clip grooves 482 can each be configured to receive a different one of the spring clips 284 in order to engage the ring shoulder 217 between the spring clip 284 and the stepped shoulder 387.

In the present aspect, the gasket 272 can define a plurality of voids 472 arranged in a radial pattern around the gasket bore 275. Each void 472 can comprise a plurality of interconnected blind holes 474. In the present aspect, blind holes 474 can increase in diameter from the radially inner lip 274 towards the radially outer lip 276. In other aspects, the voids 472 can be arranged in a different pattern, such as circumferentially, and the voids 472 can define a different shape, such as a slot, groove, oval, or any other suitable shape. The voids 472 can be configured to facilitate stretching of the radially inner lip 274 over the pipe length 102 (shown in FIG. 3) and compression of the gasket 272 between the pipe length 102 and the body bore 201 (shown in FIG. 3).

Figure 5:
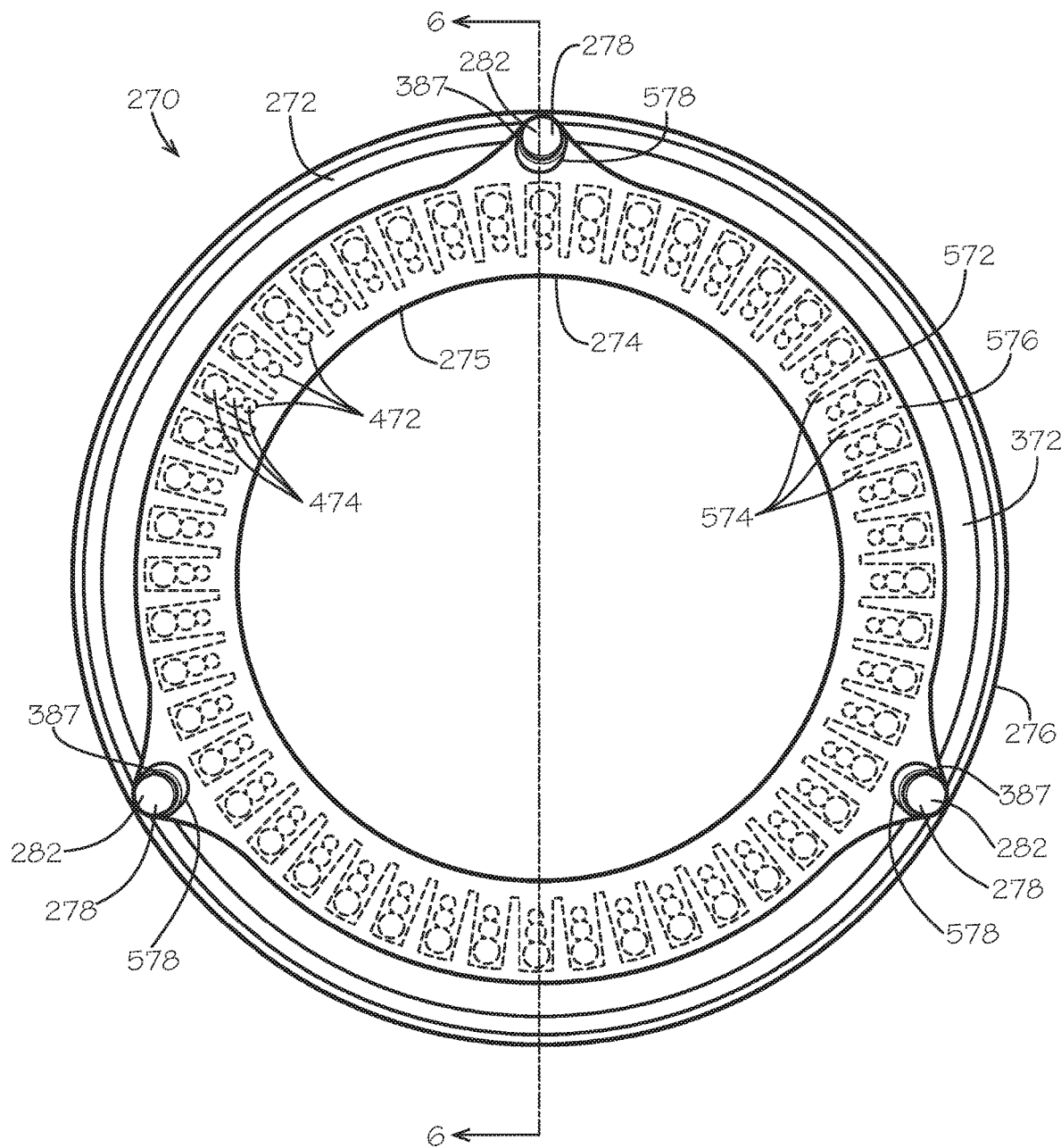
FIG. 5 is an end view of the gasket assembly of the wide range coupling of FIG. 1 facing an axially outer gasket surface of a gasket of the gasket assembly.

FIG. 5 is an end view of the gasket assembly 270 of FIG. 2 facing the axially outer gasket surface 372. The gasket assembly 270 can further comprise a stiffener 572 which can be embedded within the gasket 272. The stiffener 572 can define a stiffener ring 576 and a plurality of fingers 574 extending radially inward from the stiffener ring 576 towards the radially inner lip 274. The fingers 574 can each be positioned between a different pair of the voids 472.

The stiffener ring 576 can be configured to provide rigidity for portions of the gasket 272 positioned between the connectors 278, and the stiffener ring 576 can minimized or eliminate axial distortion of the gasket 272 when telescoping between the body bore 201 and the pipe length 102 (shown in FIG. 3). The stiffener ring 576 can define connector slots 578, and each connector 278 can extend through a different one of the connector slots 578. In the present aspect, the connector slots 578 can be U-shaped. In other aspects, the connector slots 578 can be enclosed apertures.

The fingers 574 can provide axial rigidity for the radially inner lip 274. The fingers 574 can prevent the radially inner lip 274 from rolling axially outward through the gaps $G_{1,2}$, (shown in FIG. 3) thereby preventing leaking of fluids between the radially inner lip 274 and the outer surface 202 (shown in FIG. 3) of the pipe length 102 (shown in FIG. 3) when the wide range coupling 110 (shown in FIG. 3) is in the engaged position. A slender profile of each finger 574 can allow the fingers 574 to roll axially inward, such as when stretching the radially inner lip 274 over the pipe end 206 (shown in FIG. 3) of the pipe length 102, while providing sufficient stiffness to support the radially inner lip 274 in the engaged position.

Figure 6:
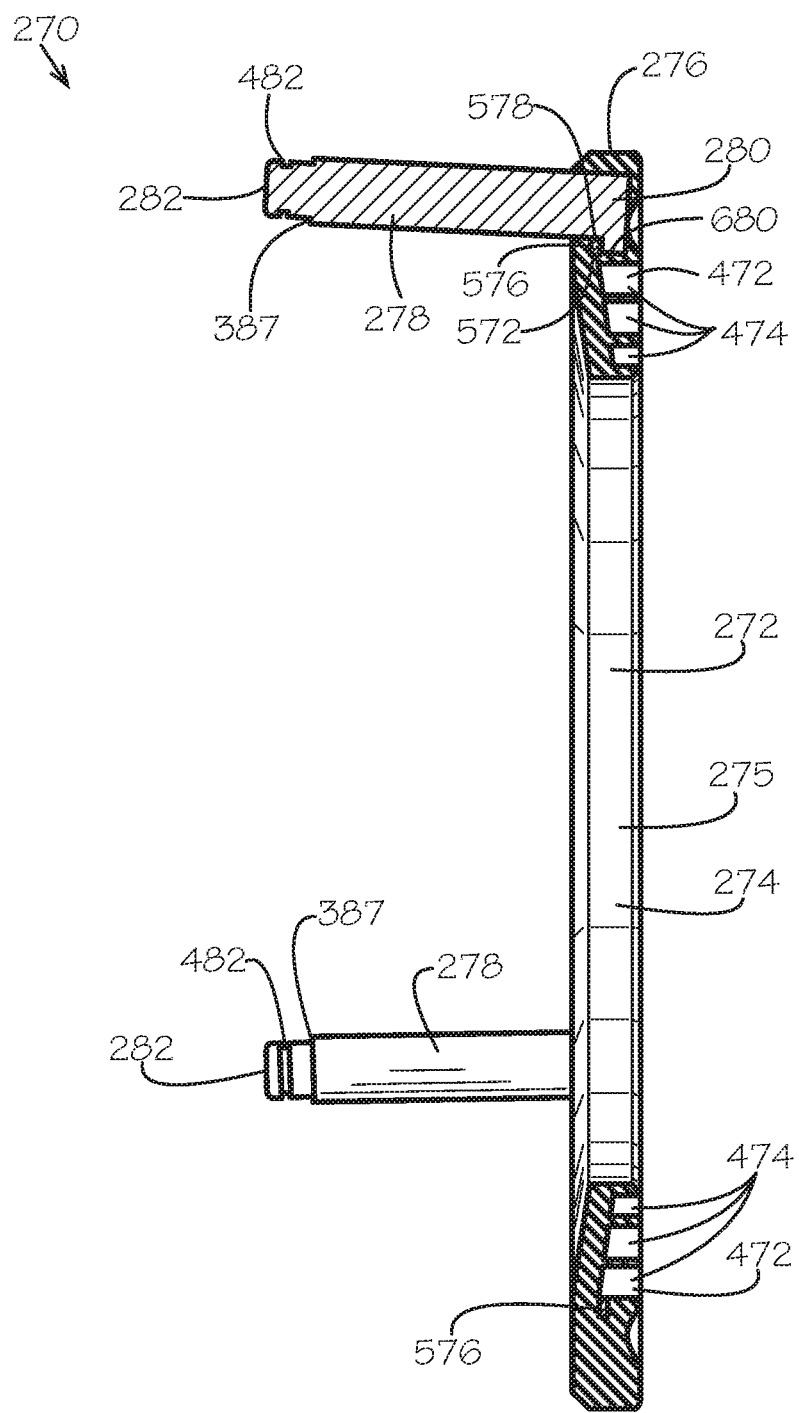
FIG. 6 is a cross sectional view of the gasket assembly of the wide range coupling of FIG. 1 taken along line 6-6 shown in FIG. 5.

FIG. 6 is a cross-section of the gasket assembly 270 of FIG. 2 taken along line 6-6 shown in FIG. 5. Each connector 278 can define a flanged head 680 disposed at the second connector end 280. Each flanged head 680 can engage a different one of the connector slots 578 to distribute a tension force from each connector 278 circumferentially around the gasket 272 through the stiffener 572 when drawing and telescoping the gasket 272 over the pipe length 102 (shown in FIG. 3).

Figure 7:
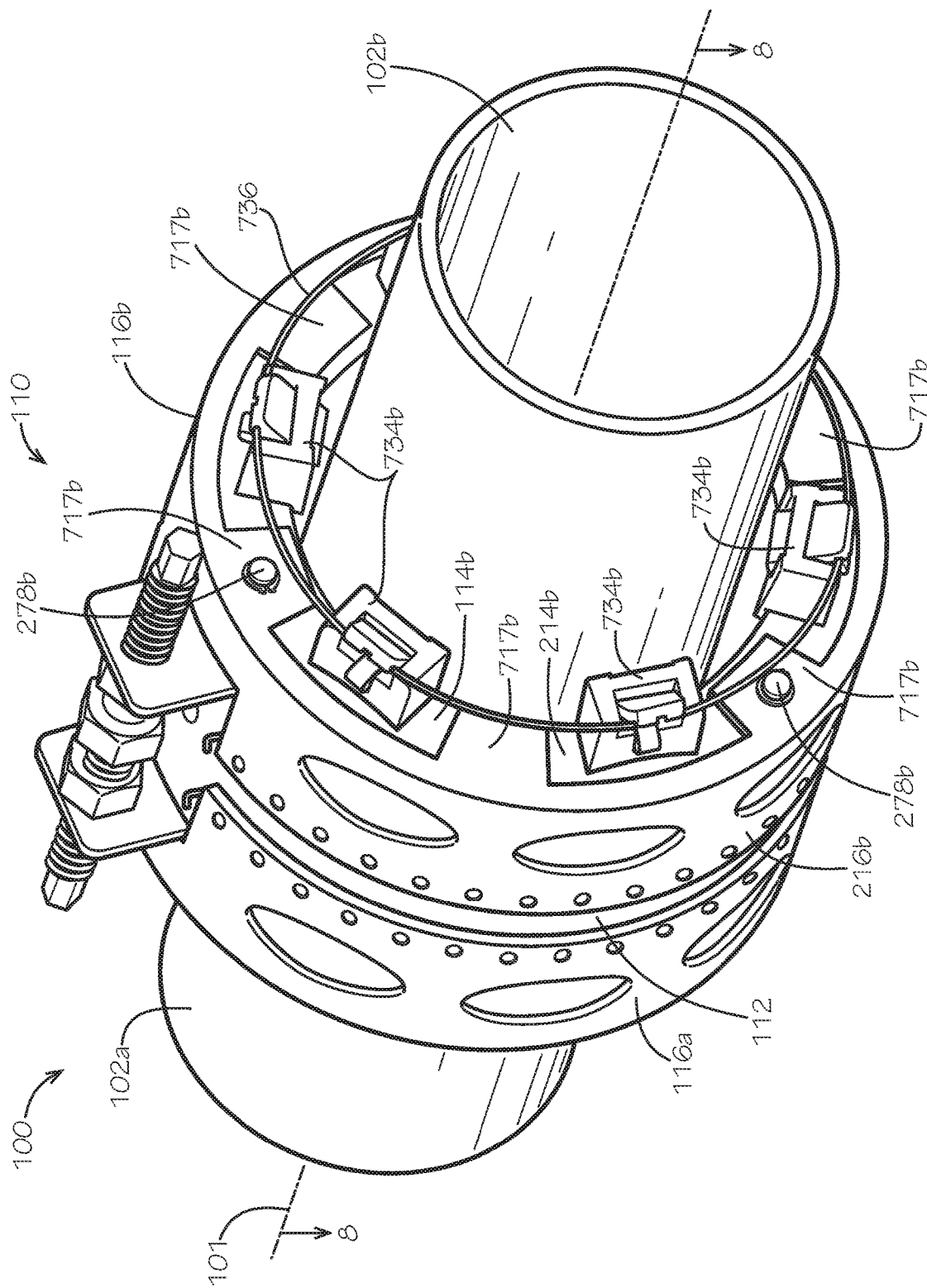
FIG. 7 is a perspective view of another aspect of the pipe connection assembly comprising another aspect of the wide range coupling in accordance with another aspect of the present disclosure.

FIG. 7 is a perspective view of the pipe connection assembly 100 comprising another aspect of the wide range coupling 110. The aspect of the wide range coupling 110 of FIG. 1 can be an unrestrained wide range coupling wherein the pipe lengths 102a,b are not mechanically restrained in an axial direction relative to the wide range coupling 110 except by friction from the gaskets 272a,b (shown in FIG. 2). The aspect of the wide range coupling 110 of FIG. 7 can be a restrained wide range coupling which can comprise joint restraint assemblies 734. The joint restraint assemblies 734a,b (joint restraint assemblies 734a shown in FIG. 8) can be configured to mechanically restrain the pipe lengths 102a,b to the wide range coupling 110. The joint restraint assemblies 734a,b are further described in U.S. patent application Ser. No. 15/490,926, filed Apr. 19, 2017, now U.S. Pat. No. 10,677,381, which is hereby incorporated by reference in its entirety.

The joint restraint assemblies 734a,b can be attached to the body shoulders 214a,b (body shoulder 214a shown in FIG. 8) of the body 112. In place of the ring shoulders 217a,b (shown in FIG. 2), the end rings 116a,b can define ring shoulder tabs, as represented by the ring shoulder tabs 717b. The joint restraint assemblies 734b can extend outwards between the ring shoulder tabs 717b when the wide range coupling 110 is in the disengaged position as shown in FIG. 7. In other aspects, the joint restraint assemblies 734a,b can be attached to the end rings 116a,b.

In the present aspect, a deactivation mechanism 736 can be positioned around either or both of the joint restraint assemblies 734a,b, which can place the joint restraint assemblies 734a,b in a deactivated configuration. The deactivation mechanism 736 can be removed from the respective joint restraint assembly 734a,b to place the joint restraint assembly 734a,b in an activated configuration. In the present aspect, the ring shoulder tabs 717b can be configured to remove the deactivation mechanism 736 from the joint restraint assemblies 734b when telescoped axially outward to the engaged position, or the deactivation mechanism 736 can be manually removed by cutting the deactivation mechanism 736 or slipping the deactivation mechanism off of the joint restraint assemblies 734b.

Figure 8:
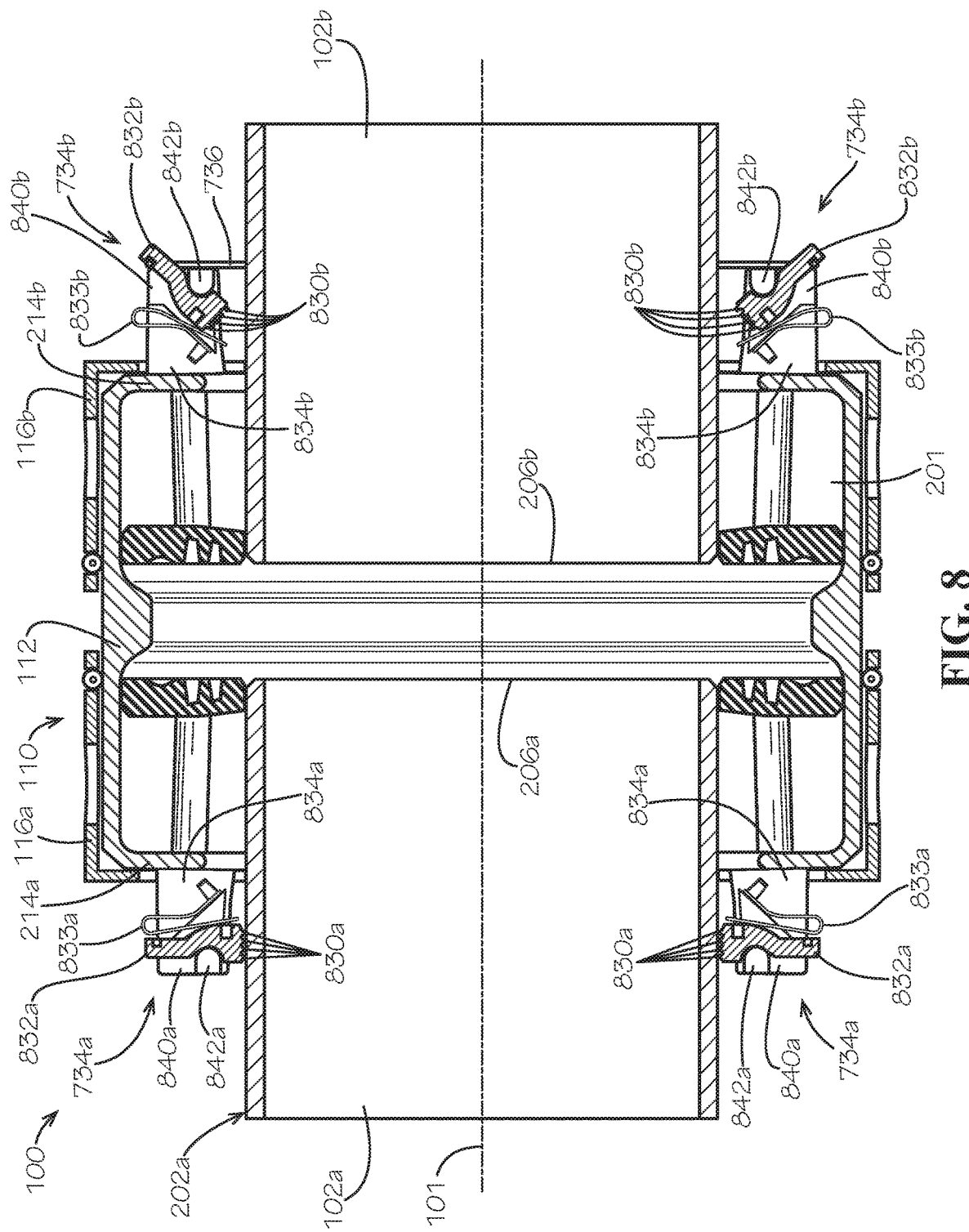
FIG. 8 is cross sectional view of the pipe connection assembly of FIG. 7 taken along line 8-8 shown in FIG. 7 with the wide range coupling in a disengaged position.

FIG. 8 is a cross-section of the pipe connection assembly 100 of FIG. 7 taken along line 8-8 shown in FIG. 7. The wide range coupling 110 is shown in the disengaged position. The joint restraint assemblies 734a,b can each respectively comprise a restraint base 834a,b, a gripper 832a,b, and a spring clip 833a,b. The restraint bases 834a,b can be attached to the respective body shoulders 214a,b. In the present aspect, the restraint bases 834a,b can be radially movable along the body shoulders 214a,b relative to the axis 101. As shown, the restraint bases 834a can be translated radially inwards towards the first pipe length 102a compared to the position of the restraint bases 834b. Translating the restraint bases 834a,b radially inward and outwards can increase a range of compatible pipe diameters which the joint restraint assemblies 734a,b can accommodate.

The restraint bases 834a,b can each define a restraint pocket 840a,b and a restraint pivot 842a,b disposed within the respective restraint pocket 840a,b. The grippers 832a,b can each be positioned within a different one of the respective restraint pockets 840a,b, and the grippers 832a,b can be configured to rotate around the respective restraint pivots 842a,b. The grippers 832a,b can each define a plurality of gripping protuberances 830a,b, such as teeth or ribs, which can be configured to engage and dig into the outer surface 202a,b of the respective pipe lengths 102a,b. The spring clips 833a,b can be positioned within the restraint pockets 840a,b, and the spring clips 833a,b can bias the grippers 832a,b to engage the gripping protuberances 830a,b with the outer surface 202a,b of the pipe lengths 102a,b, respectively.

In the present aspect, the joint restraint assemblies 734a can be in the activated configuration, and the grippers 832a can engage and dig into outer surface 202a of the first pipe length 102a. With the gripping protuberances 830a of the grippers 832a engaging the outer surface 202a of the first pipe length 102a, the first pipe end 206a of the first pipe length 102a can be prevented from withdrawing from the body bore 201 of the body 112. In the present aspect, the grippers 832a may not resist insertion of the first pipe end 206a of the first pipe length 102a into the body bore 201 because the grippers 832a can rotate with the first pipe length 102a to permit insertion in the activated configuration. However, a shape of the restraint pockets 840a can prevent the grippers 832a from further rotating past the activated configuration to permit withdrawal of the first pipe length 102a. In the activated configuration, the grippers 832a can be substantially perpendicular to the outer surface 202a, and interference between the grippers 832a and the restraint bases 834a prevents further rotation of the grippers 832a about the restraint pivots 842a, thereby preventing the gripping protuberances 830a from disengaging the outer surface 202a.

As previously discussed, the deactivation mechanism 736 can place the joint restraint assemblies 734b in the deactivated configuration. The deactivation mechanism 736 can be an elastic member, such as an O-ring, a rubber band, a bungee cord, or any other suitable elastic member. The deactivation mechanism 736 can act on the grippers 832b opposite from the spring clips 833b. The deactivation mechanism 736 can overpower the spring clips 833b to bias the grippers 832b to rotate around the restraint pivots 842b away from engagement with the outer surface 202b of the second pipe length 102b. In other aspects, the deactivation mechanism 736 can be inelastic, and the deactivation mechanism 736 can be cinched snugly around the joint restraint assemblies 734b, such as by tying, tensioning, or strapping the deactivation mechanism around the joint restraint assemblies 734b. With the joint restraint assemblies 734b in the deactivated configuration and the grippers 832b rotated out of engagement with the second pipe length 102b, the first pipe end 206b of the second pipe length 102b can freely be withdrawn from the body bore 201 of the body 112.

Figure 9:
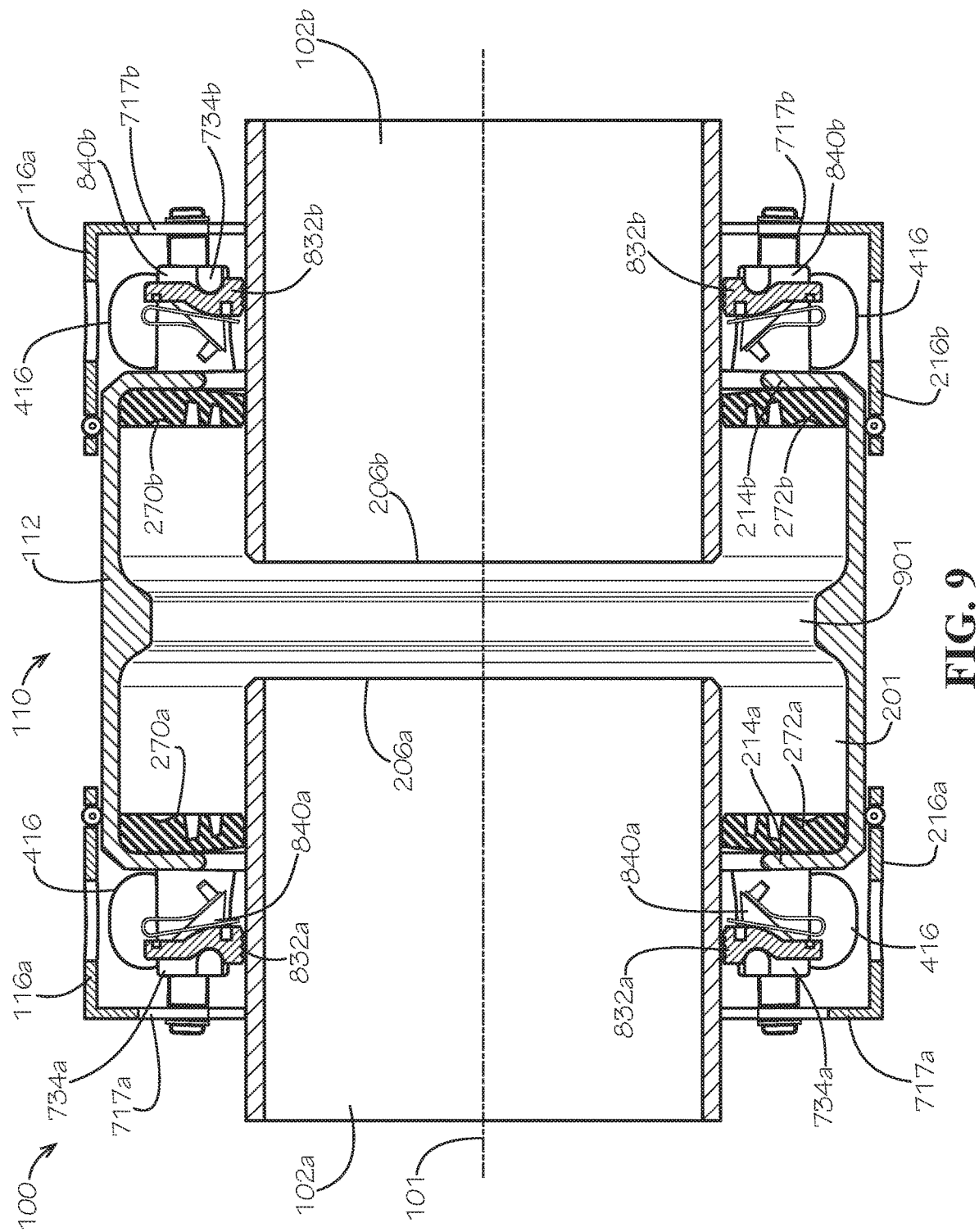
FIG. 9 is a cross sectional view of the pipe connection assembly of FIG. 7 taken along line 8-8 shown in FIG. 7 with the wide range coupling in the engaged position.

FIG. 9 is a cross-section of the pipe connection assembly 100 of FIG. 7 taken along line 8-8 shown in FIG. 7 with the wide range coupling 110 in the engaged position. In the engaged position, the end rings 116a,b can extend axially outwards over the joint restraint assemblies 734a,b, and the joint restraint assemblies 734a,b can be positioned between the respective body shoulders 214a,b and the respective ring shoulder tabs 717a,b. The annular ring walls 216a,b can cover and protect the joint restraint assemblies 734a,b, such as to prevent debris from entering the restraint pockets 840a,b which could interfere with rotation of the grippers 832a,b. In the present aspect, the annular ring wall openings 416 can provide access to the joint restraint assemblies 734a,b in the engaged position, such as to manually deactivate the joint restraint assemblies 734a,b. In other aspects, the annular ring walls 216a,b may not define the annular ring wall openings 416 which can be desirable to provide further coverage and protection of the joint restraint assemblies 734a,b.

In practice, each pipe length 102a,b can be stabbed into the body bore 201 of the wide range coupling 110 with the wide range coupling 110 in the disengaged position and the joint restraint assemblies 734a,b held in the deactivated configuration by a pair of deactivation mechanisms, such as the deactivation mechanism 736 shown in FIG. 8. The gaskets 272a,b of the gasket assemblies 270a,b can contact the first pipe ends 206a,b of the pipe lengths 102a,b to provide a positive stop for the pipe lengths 102a,b. The body bore 201 can define a center ridge 901 which can extend radially inward into the body bore 201. In some aspects, the center ridge 901 can be configured to contact the first pipe ends 206a,b to provide a positive stop for the pipe lengths 102a,b; however in the aspect shown, the center ridge 901 may not be configured to contact the pipe lengths 102a,b. In some aspects, the center ridge 901 can function to provide stiffness to the body 112, such as if the body 112, in some aspects, defines handles or has handles attached to the body 112.

Once the first pipe ends 206a,b of the pipe lengths 102a,b are stabbed into the body bore 201, the joint restraint assemblies 734a,b can be placed in the active configuration to prevent restrain the pipe lengths 102a,b, thereby preventing withdrawal of the pipe lengths 102a,b from the body bore 201. With the pipe lengths 102a,b restrained, the spreader mechanism 120 (shown in FIG. 1) can be operated to axially telescope the end rings 116a,b and gasket assemblies 270a,b outwards along the body 112, thereby drawing the gaskets 272a,b over the first pipe ends 206a,b. The joint restraint assemblies 734a,b can resist an axially outward force exerted on the pipe lengths 102a,b by the gasket assemblies 270a,b, thereby preventing the pipe lengths 102a,b from backing out or withdrawing during engagement of the wide range coupling 110. Alternatively, the spreader mechanism 120 can be operated prior to activating the joint restraint assemblies 734a,b, and the ring shoulder tabs 717a,b can strip the deactivation mechanisms 736 off of the joint restraint assemblies 734a,b during axially outward telescoping of the end rings 116a,b, thereby automatically activating the joint restraint assemblies 734a,b.

The joint restraint assemblies 734a,b are only a single example of a restraint mechanism. Other existing restraint mechanisms are known in the art and can be adapted to the wide range coupling 110 for restrained applications. For example and without limitation, grippers can be mounted to screws configured to translate the grippers radially inward and outward to engage the pipe lengths 102a,b.

In the present aspect, the body 112, end rings 116a,b, restraint bases 834a,b, and grippers 832a,b can comprise a metal, such as cast iron, ductile iron, carbon steel, stainless steel, or any other suitable material, such as a plastic. The gaskets 272a,b can comprise an elastomeric material, such as rubber, silicone, neoprene, nitrile rubber, ethylene-propylene diene monomer, fluorocarbon elastomer, or any other suitable materials.

The wide range coupling 110 can accommodate pipe lengths 102a,b of any common material. For example and without limitation, the pipe lengths 102a,b can comprise a metal such as steel, iron, copper, or another metal, plastic such as polyvinyl chloride, polyethylene, acrylonitrile butadiene styrene, or another plastic, a composite such as fiberglass, or any other suitable material. The wide range coupling 110 can join pipe lengths 102a,b comprising the same or dissimilar materials.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A wide range coupling comprising:
a body, the body defining a first body end and a second body end, the body defining a body bore extending through the body from the first body end to the second body end, the body bore defining an axis, the body defining a body shoulder disposed at the first body end, the body shoulder extending radially inward into the body bore; and
an end ring, the end ring positioned over the first body end, the end ring defining a ring shoulder extending radially inward towards the body; and
a gasket connected to the end ring, the gasket disposed within the body bore, the gasket defining a radially outer lip and a radially inner lip, the radially outer lip forming a seal with the body, the end ring and the gasket configured to axially travel along the axis relative to the body, the end ring and the gasket selectively positionable about and between an engaged position and a disengaged position, the ring shoulder contacting the body shoulder when the end ring is in the disengaged position, the gasket contacting the body shoulder when the end ring is in the engaged position.

2. The wide range coupling of claim 1, further comprising a spreader mechanism attached to the end ring, the spreader mechanism configured to control axial travel of the end ring and the gasket relative to the axis of the body.

3. The wide range coupling of claim 2, wherein:
the end ring is a first end ring;
the gasket is a first gasket;
the wide range coupling further comprises a second end ring positioned over the second body end;
the wide range coupling further comprises a second gasket connected to the second end ring; and
the spreader mechanism is configured to simultaneously telescope the first end ring and the second end ring in opposite axial directions.

4. The wide range coupling of claim 2, wherein:
the spreader mechanism is a jack bolt defining a threaded portion;
the end ring further comprises a spreader bracket threadedly engaged to the threaded portion; and
the jack bolt is configured to axially telescope the end ring and the gasket relative to the body by turning the jack bolt.

5. The wide range coupling of claim 1, further comprising a bearing captured between the body and the end ring, the bearing configured to reduce friction and prevent binding between the end ring and the body.

6. The wide range coupling of claim 1, wherein:
a connector attaches the gasket to the end ring;
the body shoulder defines a connector opening extending through the body shoulder; and
the connector extends through the connector opening.

7. The wide range coupling of claim 1, wherein:
a connector defines a first connector end and a second connector end;
the first connector end is disposed opposite from the second connector end;
the first connector end is attached to the end ring;
the second connector end is attached to the gasket;
the end ring is axially fixed relative to the gasket; and
the connector extends axially and radially inward from the first connector end to the second connector end.

8. A pipe connection assembly comprising:
a pipe length, the pipe length defining an inner surface and an outer surface, the inner surface defining a pipe bore; and
a wide range coupling, the wide range coupling comprising:
a body, the body defining a first body end and a second body end, the body defining a body bore extending through the body from the first body end to the second body end, the body bore defining an axis;
an end ring, the end ring positioned over the first body end, the end ring configured to axially telescope relative to the body; and
a gasket connected to the end ring, the gasket disposed within the body bore, the gasket defining a radially outer lip and a radially inner lip, the radially outer lip forming a seal with the body, the radially inner lip forming a seal with the outer surface of the pipe length with the end ring and the gasket positioned in an engaged position, the gasket sealing the body bore in fluid communication with the pipe bore; and
wherein the end ring is configured to draw the radially inner lip of the gasket over a first pipe end of the pipe length when the end ring is axially telescoped outward from the body.

9. The pipe connection assembly of claim 8, wherein the end ring is mechanically engaged with a spreader mechanism, and wherein the spreader mechanism is configured to control inward and outward axial travel of the end ring relative to the body.

10. The pipe connection assembly of claim 8, wherein:
the pipe length is a first pipe length;
a pipe end of the first pipe length is positioned within the body bore;
the end ring is a first end ring;
the gasket is a first gasket; and
the pipe connection assembly further comprises:
a second pipe length defining an inner surface and an outer surface, the inner surface defining a pipe bore, a pipe end of the second pipe length positioned within the body bore;
a second end ring positioned over the second body end; and
a second gasket engaging the second end ring, the second gasket forming a seal with the body and the outer surface of the second pipe length.

11. The pipe connection assembly of claim 10, wherein the body, the first gasket, the second gasket, the first pipe length, and the second pipe length define a sealed cavity connecting the pipe bore of the first pipe length in fluid communication with the pipe bore of the second pipe length.

12. The pipe connection assembly of claim 8, wherein the radial inner lip of the gasket is stretched over the outer surface of the pipe length, and wherein the gasket is compressed between the body bore of the body and the outer surface of the pipe length.

13. A method of connecting a pipe length to a wide range coupling, the method comprising:
    inserting a first pipe end of the pipe length into a body bore through a first body end of a body of the wide range coupling, the body further defining a second body end disposed opposite from the first body end, the body bore extending through the body from the first body end to the second body end;
    contacting the first pipe end with a radially inner lip of a gasket, the gasket disposed within the body bore between the first body end and the second body end;
    drawing the radially inner lip of the gasket over the first pipe end in an axial direction moving away from the second body end of the body;
    forming a seal between the radially inner lip of the gasket and an outer surface of the pipe length;
    forming a seal between a radially outer lip of the gasket and the body bore of the body; further comprising axially telescoping an end ring outward from the body along an axis of the body bore, the end ring positioned over the first end of the body.

14. The method of claim 13, wherein the gasket is connected to the end ring, and wherein axially telescoping the end ring outward from the body along the axis draws the radially inner lip of the gasket over the first pipe end.

15. The method of claim 13, further comprising rotating a jack bolt to axially telescope the end ring, the jack bolt threadedly engaging a spreader bracket of the end ring.

16. The method of claim 13, further comprising stretching the radially inner lip of the gasket over the first pipe end and compressing the gasket between the outer surface of the pipe length and the body bore of the body.

17. The method of claim 13, wherein drawing the radially inner lip of the gasket over the first pipe end comprises rolling the radially inner lip of the gasket axially inwards relative to an axis of the body bore.

18. A wide range coupling comprising:
    a body, the body defining a first body end and a second body end, the body defining a body bore extending through the body from the first body end to the second body end, the body bore defining an axis, the body defining a body shoulder disposed at the first body end, the body shoulder extending radially inward into the body bore;
    an end ring, the end ring positioned over the first body end, the end ring defining a ring shoulder extending radially inward towards the body; and
    a gasket connected to the end ring, the gasket disposed within the body bore, the gasket defining a radially outer lip and a radially inner lip, the radially outer lip forming a seal with the body, the end ring and the gasket configured to axially travel along the axis relative to the body, the end ring and the gasket selectively positionable about and between an engaged position and a disengaged position; and
    a spreader mechanism attached to the end ring, the spreader mechanism configured to control axial travel of the end ring and the gasket relative to the axis of the body; and
    wherein:
        the end ring is a first end ring;
        the gasket is a first gasket;
        the wide range coupling further comprises a second end ring positioned over the second body end;
        the wide range coupling further comprises a second gasket connected to the second end ring; and
        the spreader mechanism is configured to simultaneously telescope the first end ring and the second end ring in opposite axial directions.

19. A wide range coupling comprising:
    a body, the body defining a first body end and a second body end, the body defining a body bore extending through the body from the first body end to the second body end, the body bore defining an axis, the body defining a body shoulder disposed at the first body end, the body shoulder extending radially inward into the body bore;
    an end ring, the end ring positioned over the first body end, the end ring defining a ring shoulder extending radially inward towards the body; and
    a gasket connected to the end ring, the gasket disposed within the body bore, the gasket defining a radially outer lip and a radially inner lip, the radially outer lip forming a seal with the body, the end ring and the gasket configured to axially travel along the axis relative to the body, the end ring and the gasket selectively positionable about and between an engaged position and a disengaged position; and
    a bearing captured between the body and the end ring, the bearing configured to reduce friction and prevent binding between the end ring and the body.

20. A wide range coupling comprising:
    a body, the body defining a first body end and a second body end, the body defining a body bore extending through the body from the first body end to the second body end, the body bore defining an axis, the body defining a body shoulder disposed at the first body end, the body shoulder extending radially inward into the body bore, the body shoulder defining a connector opening extending through the body shoulder; and
    an end ring, the end ring positioned over the first body end, the end ring defining a ring shoulder extending radially inward towards the body; and
    a gasket connected to the end ring, the gasket disposed within the body bore, the gasket defining a radially outer lip and a radially inner lip, the radially outer lip forming a seal with the body, the end ring and the gasket configured to axially travel along the axis relative to the body, the end ring and the gasket selectively positionable about and between an engaged position and a disengaged position, a connecter attaching the gasket to the end ring, the connector extending through the connector opening.

21. A wide range coupling comprising:
    a body, the body defining a first body end and a second body end, the body defining a body bore extending through the body from the first body end to the second body end, the body bore defining an axis, the body defining a body shoulder disposed at the first body end, the body shoulder extending radially inward into the body bore; and
    an end ring, the end ring positioned over the first body end, the end ring defining a ring shoulder extending radially inward towards the body; and
    a gasket connected to the end ring, the gasket disposed within the body bore, the gasket defining a radially outer lip and a radially inner lip, the radially outer lip forming a seal with the body, the end ring and the gasket configured to axially travel along the axis relative to the body, the end ring and the gasket selectively positionable about and between an engaged position and a disengaged position; and wherein:
  a connector defines a first connector end and a second connector end;
  the first connector end is disposed opposite from the second connector end;
  the first connector end is attached to the end ring;
  the second connector end is attached to the gasket;
  the end ring is axially fixed relative to the gasket; and
  the connector extends axially and radially inward from the first connector end to the second connector end.

* * * * *